3,188,210
Patented June 8, 1965

3,188,210

NAPHTHOQUINONE (1,2)-DIAZIDE-SULFONIC ACID DERIVATIVES AND PROCESS OF PRODUCING PRINTING PLATES THEREFROM

Gerhard Fritz, Wiesbaden, and Oskar Süs, Fritz Uhlig, and Wilhelm Neugebauer, Wiesbaden-Biebrich, Germany, assignors, by mesne assignments, to Azoplate Corporation, Murray Hill, N.J., a corporation of New Jersey No Drawing. Filed Jan. 13, 1960, Ser. No. 2,108
Claims priority, application Germany, Jan. 21, 1959, K 36,769
5 Claims. (Cl. 96—33)

Printing plates provided with a reproduction layer have already been manufactured which, in the reproduction layer, contain naphthoquinone-(1,2)-diazide sulfoesters as light sensitve substances.

Now reproduction layers, especially for printing plates, have been found which comprise or consist of one or more light-sensitive esters, having at least one free hydroxyl group, of naphthoquinone-(1,2)-diazide-sulfonic acids and such organic compounds which have at least 2 hydroxyl groups and contain two benzene or naphthalene nuclei linked to each other by a linking member X, the member X being either a methylene group, or a methylene group substituted by one or two lower alkyl radicals, aryl or substituted aryl, or a methylene group belonging to a saturated alicyclic system, and in which the benzene or napthalene nuclei may contain, besides the hydroxyl groups, halogens and/or alkyl and/or alkoxy and/or carbalkoxy radicals. If desired, the light sensitive esters can be applied in admixture with alkali soluble resins.

The light sensitive esters are prepared in known manner by reaction of the naphthoquinone-(1,2)-diazide-sulfonic acids, generally in the form of their sulfochlorides, with the organic compounds containing at least two hydroxyl groups. Those naphthoquinone-(1,2)-diazide-sulfoesters have proved especially suitable which are derived from naphthoquinone-(1,2)-diazide-(2)-sulfonic acid-(5) or
naphthoquinone-(1,2)-diazide-(2)-sulfonic acid-(4), but esters derived from other naphthoquinone-(1,2)-diazide-sulfonic acids, such as
naphthoquinone-(1,2)-diazide-(1)-sulfonic acid-(4),
naphthoquinone-(1,2)-diazide-(1)-sulfonic acid-(5),
naphthoquinone-(1,2)-diazide-(1)-sulfonic acid-(6),
naphthoquinone-(1,2)-diazide-(1)-sulfonic acid-(7) and
naphthoquinone-(1-2)-diazide-(1)-sulfonic acid-(8)

may also be used.

Among the organic compounds containing at least two hydroxyl groups the following have been found to be especially suitable:

2,4,2′,4′-tetrahydroxy-6,6′-dimethyl-diphenyl-methane
2,6,2′,6′-tetrahydroxy-3,5,3′,5′-tetrachloro-diphenyl-methane.
2,2′-dihydroxy-4,4′-dimethyl-diphenyl-ethane-(1,1)
2,2′-dihydroxy-4,4′-dimethoxy-diphenylethane-(1,1)
2,4,2′,4′-tetrahydroxy-diphenyl-ethane-(1,1)
2,2′-dihydroxy-4,4′-dimethoxy-triphenyl-methane
2,2′-dihydroxy-dinaphthyl-(1,1)-methane
2,4,2′,4′-tetrahydroxy-6,6′-dimethyl-diphenyl-ethane-(1,1)
2,4,2′4′-tetrahydroxy-6,6′-dicarbmethoxy-diphenyl-methane
2,4,2′,4′-tetrahydroxy-6,6′-dimethyl-triphenyl-methane
2,4,2′,4′-tetrahydroxy-diphenyl-propane-(1,1)
2,4,2′,4′-tetrahydroxy-diphenyl-n-butane (1,1)
2,2,4,4′,4″pentahydroxy-triphenyl-methane
2,4,2′,4′-tetrahydroxy-diphenyl-cyclohexane-(1,1)
2,2′-dihydroxy-4,4′-dimethoxy-diphenyl-methane
2,4,2′,4′-tetrahydroxy-diphenyl-pentane-(1,1)
2,4,2′,4′-tetrahydroxy-diphenyl-propane-(2,2)
2,4,2′,4′-tetrahydroxy-triphenyl-methane
2,2′-dihydroxy-5,5′-dibromo-diphenyl-methane
2,2′-dihydroxy-5,5′-dichloro-diphenyl-ethane-(1,1)
2,2′-dihydroxy-5,5′-dibromo-diphenyl-ethane-(1,1)

As can be seen form this list, the compounds contemplated are those in which two benzene or naphthalene nuclei are joined to each other by a linking member, such as a methylene group or a methylene group substituted by one or two lower alkyl radicals, or a methylene group substituted by aryl radicals or substituted aryl radicals, or a methylene group belonging to a saturated alicyclic system. The two benzene or naphthalene nuclei together contain at least two hydroxyl groups. Besides these hydroxyl groups, there may be present in the benzene and naphthalene nuclei other substituents, such as halogens, e.g. chlorine, bromine or fluorine, or the benzene and naphthalene nuclei may be substituted by lower alkyl radicals or lower alkoxy radicals or carbalkoxy radicals.

For the preparation of the esters, the two components, of which the sulfonic acids are generally used in the form of their sulfochlorides, are usually dissolved in a solvent, such as dioxane, tetrahydrofurane, dimethylformamide, or ethyleneglycol monomethylether, and then esterified by adding to the solution an acid-binding agent, such as alkali bicarbonates, alkali-carbonates or other weak alkalies or amines, preferably tertiary amines, such as pyridine or N-ethyl-piperidine. Only such quantities of the acid-binding agent are to be used as will render the reaction mixture neutral or weakly alkaline, thus avoiding formation of a dyestuff. For separation, the reaction product is precipitated by adding water or preferably a dilute acid, e.g. dilute hydrochloric acid to the reaction mixture, filtered by suction and dried. In most cases, the sulfoesters thus obtained can be immediately used for the preparation of the light sensitive reproduction layers. They may also be further purified by solution in a suitable solvent, such as dioxane, and subsequent reprecipitation by the addition of water to the solution. By choosing suitable quantities of the naphthoquinone-(1,2)-diazide-sulfochloride and of the acid-binding agent used in the reaction, one or more hydroxyl groups may be esterified as desired.

For the preparation of the reproduction layers, the naphthoquinone-(1,2)-diazide-sulfoesters containing hydroxyl groups are in known manner dissolved in organic solvents, such as ethyleneglycol monomethylether, ethyleneglycol monoethylether, dioxane, dimethyl formamide or aliphatic ketones, and then coated onto suitable supports, e.g. metal foils or plates consisting of aluminum, zinc or copper or of layers of several metals or plastic films or paper or glass. On these reproduction layers, copies are produced in known manner which are then transformed into printing plates by development, using advantageously dilute alkalies, especially alkaline-reacting salts, such as trisodium phosphate or disodium phosphate. Alkali soluble resins may also be incorporated into the reproduction layers, and such addition usually leads to an improved homogeneity of the film-like coating and better adhesion to the support. Alkali-soluble resins to be used for this purpose are: natural resins, such as shellac or colophony, or synthetic resins such as copolymers of styrene or maleic anhydride and especially low-molecular condensation products of phenols and formaldehyde, the so-called "novolaks."

The amount of the alkali soluble resin to be added to the light sensitive diazo esters described above may vary widely. For the production of planographic printing plates lower concentrations of resins are used, i.e. from about 0.1 to about 1.0 part, preferably 0.3 to 0.8 part by weight of resin to 1.0 part by weight of ester. If plates are required which can withstand the acid etching agents used in etching machines, for example for the preparation of half-tone blocks, higher concentrations are used, i.e. from about 1.0 to about 6.0 parts, preferably from about 2.0 to about 4.0 parts by weight of the resin to 1.0 part of the above diazo esters.

The above described esters may also be used in admixture with each other or with other light sensitive substances.

Printing plates prepared by means of the above-described naphthoquinone - (1,2) - diazide - (2) - sulfoesters are superior to printing plates prepared by means of esters hitherto used in that they are more easily developed and have improved thermal stability, which leads to an improvement of the shelf-life of the unexposed printing plates, even under adverse conditions.

The formulae of the compounds specifically referred to in the following examples are as follows:

FORMULA 1

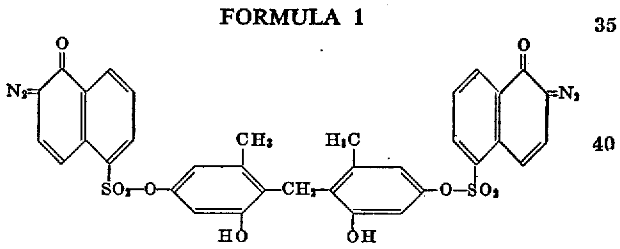

FORMULA 2

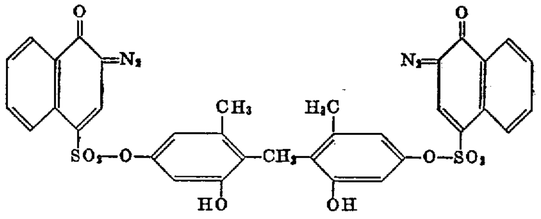

FORMULA 3

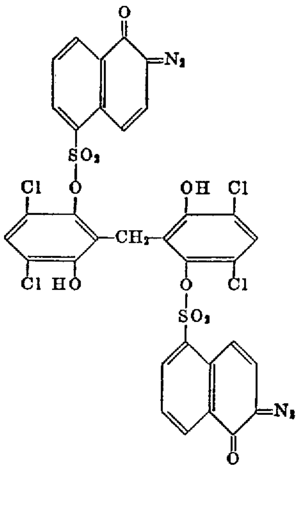

FORMULA 4

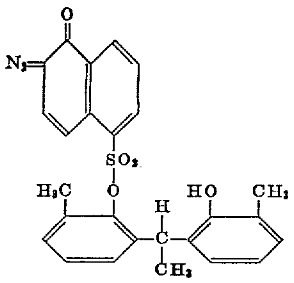

FORMULA 5

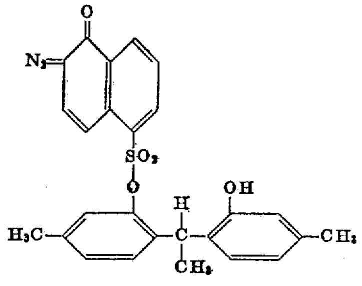

FORMULA 6

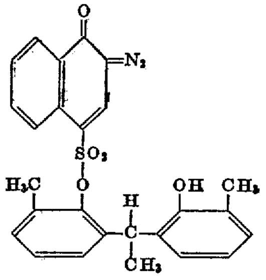

FORMULA 7

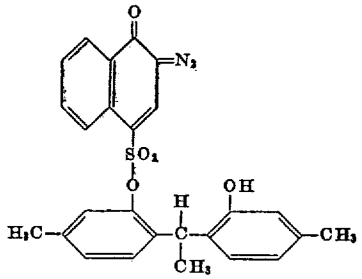

FORMULA 8

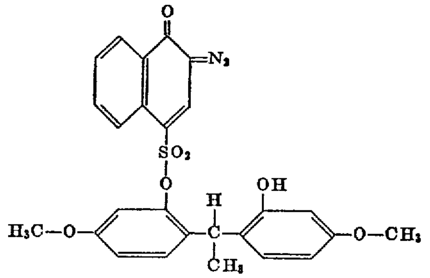

FORMULA 9

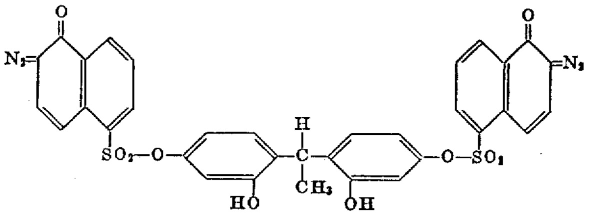

FORMULA 10
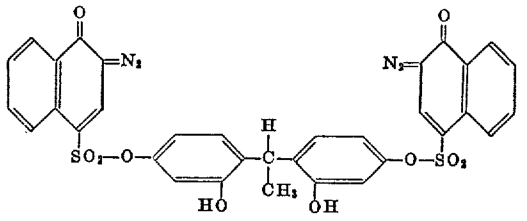
FORMULA 11
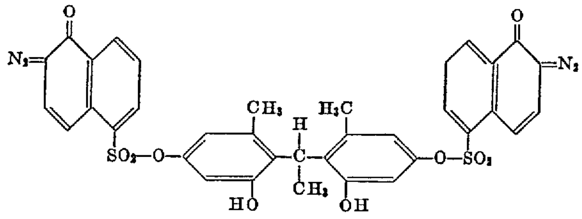
FORMULA 12
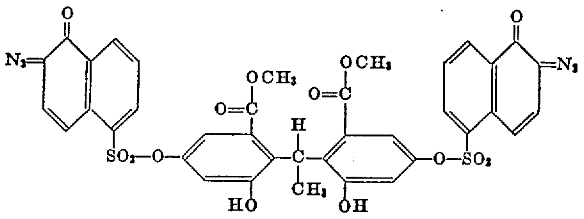
FORMULA 13
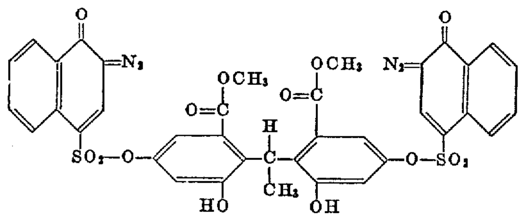
FORMULA 14
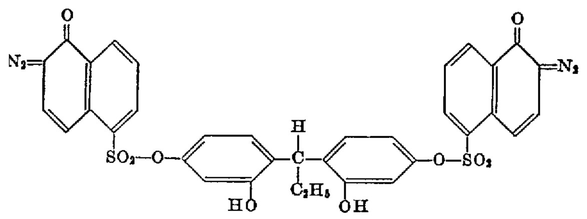
FORMULA 15
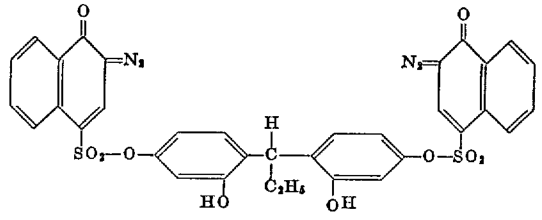
FORMULA 16
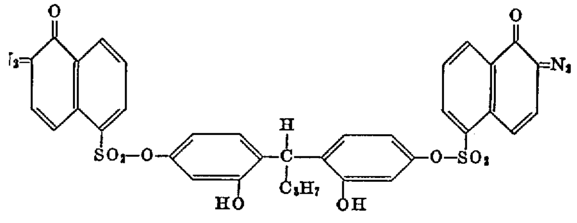
FORMULA 17
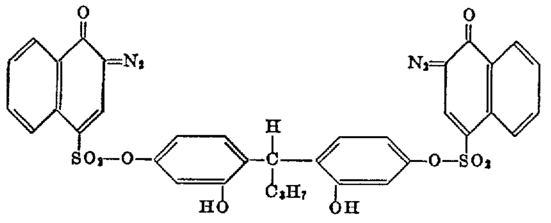
FORMULA 18
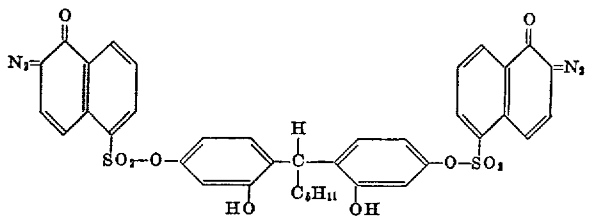
FORMULA 19
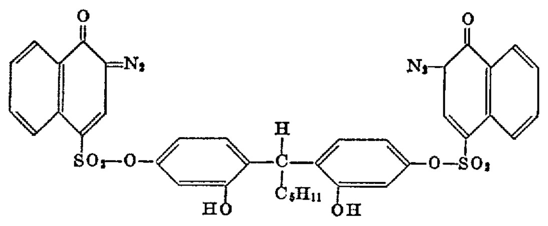
FORMULA 20
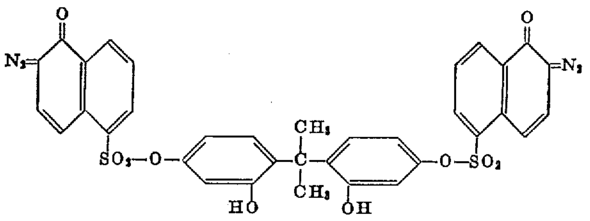
FORMULA 21
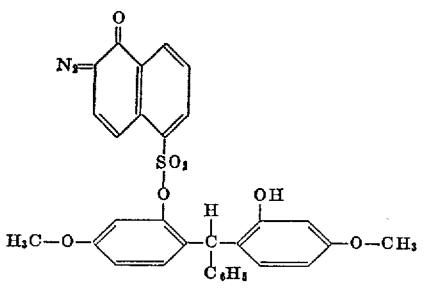
FORMULA 22
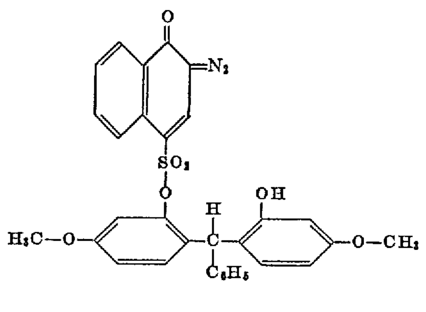

FORMULA 23

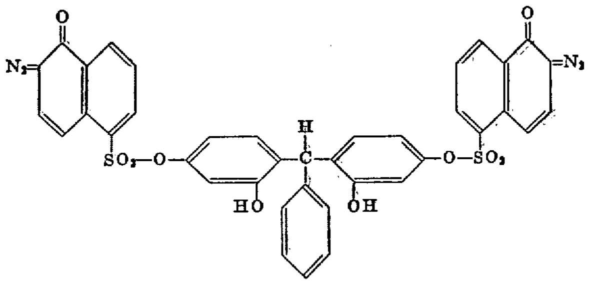

FORMULA 24

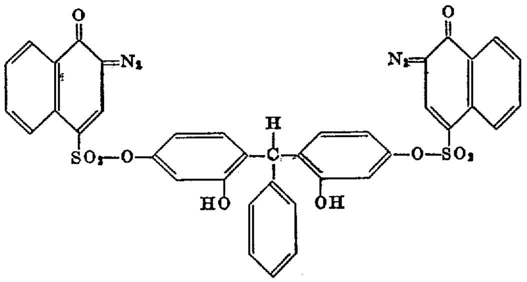

FORMULA 25

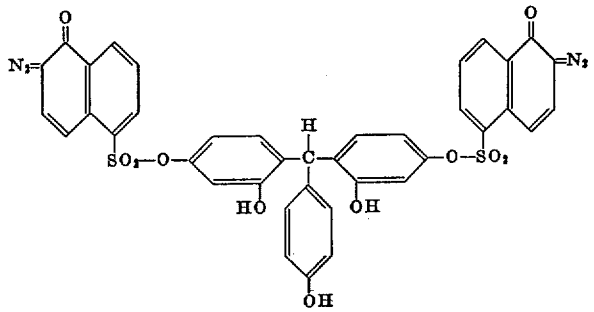

FORMULA 26

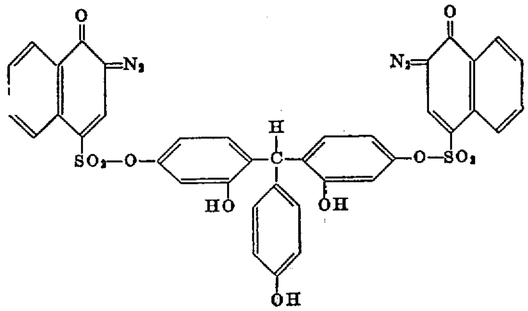

FORMULA 27

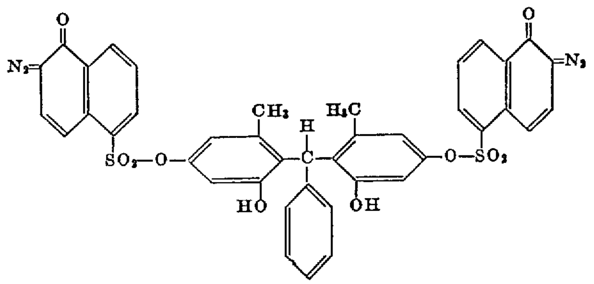

FORMULA 28

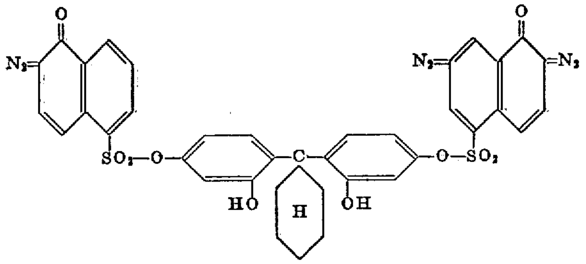

FORMULA 29

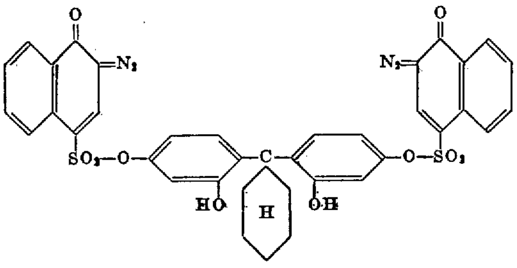

FORMULA 30

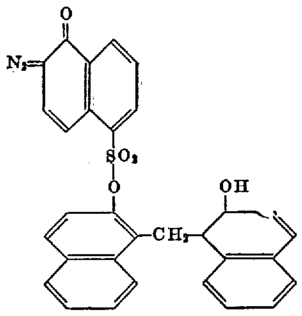

FORMULA 31

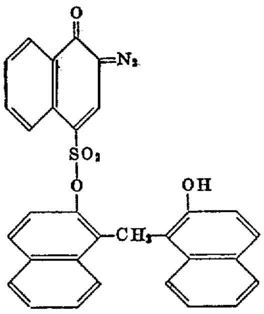

The invention will be further illustrated by reference to the following specific examples:

*Example 1*

A solution consisting of 1.5 parts by weight of the compound corresponding to Formula 1, dissolved in 100 parts by volume of ethylene glycol monomethylether, is coated on a roughened aluminum foil placed on a rotating disc. The solution thus coated onto the aluminum foil is dried and forms a thin light-sensitive layer. This light-sensitive layer is exposed under a master, as is customary in the photomechanical production of printing plates, and then developed with one percent trisodium phosphate solution. By this treatment those parts of the coated layer are removed which were struck by light during exposure. The developed foil is briefly rinsed with water and then wiped over with a 1 percent phosphoric acid solution to improve the hydrophilic properties of the base material, now uncovered in the exposed areas. The printing plate thus obtained can be inked with greasy ink and used for printing It corresponds to the master used.

Equally good results are obtained when one of the compounds corresponding to Formulae 2, 11, 12, 13 or 27 is used.

The compound corresponding to Formula 1 is prepared by reacting 2.6 parts by weight of 2,4,2′,4′-tetrahydroxy-6,6′-dimethyl-diphenyl-methane and 6.0 parts by weight of naphthoquinone-(1,2)-diazide-(2)-sulfochloride-(5) in 130 parts by volume of dioxane. The reaction takes place at room temperature and under constant stirring while sufficient 5 percent sodium carbonate solution is slowly added to render the reaction mixture neutral. The bis-ester which forms precipitates as an oily product; 200 parts by volume of water are added to the reaction mixture and the whole is agitated for another hour. The 4,4′-bis - (naphthoquinone - (1,2) - diazide-(2)-sulfonyloxy-(5))-dihydroxy-(2,2′)-dimethyl-(6,6′)-diphenyl-methane, a solid brown substance, is dissolved in dioxane, reprecipitated by adding water to the solution, and finally digested in methanol. The purified substance thus obtained begins to melt at about 350° C. while slowly darkening. It is insoluble in alkalies, easily soluble in ethyleneglycol monomethylether and difficultly soluble in methanol and ethanol.

The compound corresponding to formula 2 is obtained by dissolving 2.6 parts by weight of 2,4,2′,4′-tetrahydroxy-6,6′-dimethyl-diphenylmethane and 6.0 parts by weight of naphthoquinone-(1,2)-diazide-(2)-sulfochloride-(4) in 130 parts by volume of dioxane and adding sufficient 5 percent sodium carbonate solution to render the reaction mixture neutral. While the reaction takes place the mixture has to be constantly agitated at room temperature. The bis-ester which forms precipitates as a yellow brown oily product. After adding 200 parts by volume of water, the reaction mixture is agitated for an additional hour. The 4,4′-bis-(naphthoquinone-(1,2)-diazide-(2)-sulfonyloxy-(4)) - dihydroxy-(2,2′)-diphenylmethane thus formed, which is a yellow-brown substance, is dissolved in dioxane, reprecipitated by adding water to the solution and finally digested in methanol. The purified substance thus obtained begins to melt at about 350° C. while slowly turning dark. It is insoluble in alkalies, easily soluble in ethylene-glycol monomethylether, and difficultly soluble in methanol and ethanol.

The compound corresponding to Formula 11 is obtained by dissolving 2.7 parts by weight of 2,4,2′,4′-tetrahydroxy-6.6′-dimethyl-diphenylethane-(1,1) and 6.0 parts by weight of naphthoquinone-1,2)-diazide-(2)-sulfochloride-(5) in 130 parts by volume of dioxane. While agitating and at room temperature, sufficient 5% sodium carbonate solution is added to render the reaction mixture weakly alkaline. The esterification product separates in the form of a brownish-yellow oil; 200 parts by volume of water are added to the reaction mixture and agitation is continued for another hour. The bis-ester thus formed is a yellow-brown solid substance. For purification it is dissolved in dioxane, reprecipitated by adding water to the solution, and digested with methanol. The 4,4′-bis-(naphthoquinone - (1,2) - diazide-(2)-sulfonyloxy-(5))-dihydroxy - (2,2′) - dimethyl-(6,6′)-diphenylethane-(1,1) thus obtained begins to melt at 350° C. while slowly becoming dark. It is insoluble in alkalies, but soluble in dioxane or ethyleneglycol monomethylether.

The compound corresponding to Formula 12 is prepared by dissolving 3.6 parts by weight of 2,4,2′,4′-tetrahydroxy-6.6′-dicarbmethoxy-diphenyl-ethane - (1,1) and 6.0 parts by weight of naphthoquinone-(1,2)-diazide-(2)-sulfochloride-(5) in 150 parts by volume of dioxane. While agitating and at room temperature, sufficient 5 percent sodium carbonate solution is added to render the reaction mixture neutral. For completion of the reaction, agitation is continued for another hour. The crude bis-ester precipitates as a yellow brown oil which is decanted and mixed with 300 parts by volume of water. The reaction product solidifies to form a yellow-brown substance which is subsequently dissolved in glacial acetic acid, reprecipitated by adding water to the solution, and then digested in methanol. The 4,4′-bis-(naphthoquinone-(1,2) - diazide-(2)-sulphonyloxy - (5)) - dicarbmethoxy-(6,6′)-diphenyl-ethane-(1,1) thus obtained is a yellow, finely crystalline substance which begins to melt at about 350° C. while slowly charring . The compound is soluble in dioxane and ethyleneglycol monomethylether but almost insoluble in acetone or ethanol.

The compound corresponding to Formula 13 is prepared by reacting 3.6 parts by weight of 2,4,2′,4′-tetrahydroxy-6,6′-dicarbmethoxy-diphenyl-ethane-(1,1) with 6.0 parts by weight of naphthoquinone-(1,2)-diazide-(2)-sulfochloride-(4) in 150 parts by volume of dioxane, to which, while agitating and at room temperature, sufficient 5 percent sodium carbonate solution is slowly added to render the reaction mixture neutral. The bis-ester thus formed precipitates as a yellow-brown semi-solid product. After the crude product has been decanted, 300 parts by volume of water are added and agitation is continued for one hour. The 4,4′-bis-(naphthoquinone-(1,2)-diazide - (2) - sulfonyloxy-(4)) - dihydroxy-(2,2′)-dicarbmethoxy-(6,6′)-diphenyl-ethane-(1,1) solidifies to form a yellow solid substance. For purification the compound is dissolved in dioxane, then reprecipitated by adding water to the solution and finally digested in methanol. The bis-ester begins to melt at about 350° C. while slowly charring. It is insoluble in alkalies, easily soluble in ethyleneglycol monomethylether, and difficultly soluble in methanol or ethanol.

The compound corresponding to Formula 27 is prepared by dissolving 3.4 parts by weight of 2,4,2′,4′-tetrahydroxy - 6,6′ - dimethyl - triphenyl - methane and 6.0 parts by weight of naphthoquinone-(1,2)-diazide-(2)-sulfochloride-(5) in 130 parts by volume of dioxane. While agitating and at room temperature, sufficient 5 percent sodium carbonate solution is added as to render the reaction mixture weakly alkaline. For completion of the reaction, agitation is continued for another hour. The crude bis-ester precipitates as a yellow-brown solid substance. For purification the compound is dissolved in dioxane, reprecipitated by adding water to the solution, and finally digested in methanol. The 4,4′-bis-(naphthoquinone - (1,2) - diazide - (2) - sulfonyloxy - (5))-dihydroxy - (2-2′) - dimethyl (6,6′) - triphenyl - methane thus formed is a yellow substance which begins to melt at about 350° C. while slowly charring. It is insoluble in alkalies, readily soluble in ethyleneglycol monomethylether, and only difficultly soluble in methanol or ethanol.

A printing plate of great mechanical strength may alternatively be prepared by the following process in which the compound corresponding to Formula 13 is used.

4 parts by weight of the compound corresponding to Formula 13, 3 parts by weight of a phenolformaldehyde novolak ("Alnovol") and 0.5 part by weight of methyl violet (Schultz' "Farbstofftabellen," 7th Edition, 1931, vol. 1, p. 327) are dissolved in 92.5 parts by volume of ethylene-glycol monomethylether and the solution is coated onto a lithographic trimetallic plate containing aluminum, copper and chromium layers. The sensitized plate is exposed under an original using e.g., a closed carbon arc lamp of 18 amps at a distance of 70 cm. for about 5 minutes. Subsequently, the plate is developed with a 5 percent trisodium phosphate solution to which about 15 percent of ethyleneglycol monomethylether were added. The developed plate is then etched for about 8 to 10 minutes with a solution consisting of 500 parts by weight of calcium chloride, 250 parts by volume of water, 80 parts by volume of concentrated hydrochloric acid, and 80 parts by volume of glycerine; see U.S. Patent No. 2,687,345. Thereby, the chromium layer, barring the copper layer, is removed from the exposed parts of the plate. Subsequently, a greasy ink is applied which adheres to the areas in which the copper layer is laid free.

Thus a printing plate is obtained from which negatives of the master used can be printed.

*Example 2*

Following the general procedure of Example 1, a brushed aluminum foil is coated with a solution containing 1.5 parts by weight of the compound corresponding to Formula 3 and 0.75 part by weight of a phenol-formaldehyde novolak in 100 parts by volume of ethyleneglycol monomethylether. The coated foil is transformed into a printing plate according to the procedure of Example 1. The developer used is a 5 percent trisodium phosphate solution. A printing plate is obtained which corresponds to the master used.

The compound corresponding to Formula 3 is prepared as follows:

3.7 parts by weight of 2,6,2',6'-tetrahydroxy-3,5,3',5'-tetrachlorodiphenylmethane are dissolved in 40 parts by volume of a 3:1 mixture of dioxane and dimethyl formamide. This solution is combined with a solution of 60 parts by weight of naphthoquinone-(1,2)-diazide-(2)-sulfochloride-(5) in 50 parts by volume of dioxane. While agitating, sufficient 5 percent sodium carbonate solution is added to the mixed solution to render the reaction mixture neutral. About 80 parts by volume of sodium carbonate solution are used. The esterification product precipitates in the form of a brown-yellow oil. After adding 200 parts by volume of water to the reaction mixture, agitation is continued for another hour. For purification, the bis-ester, which is now a brownish-yellow solid substance, is dissolved in dioxane, and reprecipitated by adding water to the solution. The 2,2'-bis-(naphthoquinone-(1,2)-diazide-(2)-sulfonyloxy - (5)) - dihydroxy - (6,6')-tetrachloro-(3,5,3',5')-diphenyl methane begins to melt at 350° C. while slowly turning dark. It is insoluble in alkalies but soluble in methanol or ethanol.

*Example 3*

Following the general procedure of Example 1, a solution consisting of 1.5 parts by weight of the compound corresponding to Formula 4 dissolved in 100 parts by volume of ethyleneglycol monomethylether is coated onto a mechanically roughened aluminum foil and dried. The thus sensitized foil is exposed under a master and developed with a 5 percent trisodium phosphate solution containing about 15 percent of ethyleneglycol monomethylether. The developed foil is wiped over with one percent aqueous phosphoric acid and inked with greasy ink. A printing plate corresponding to the master used is obtained.

For the preparation of the compound corresponding to Formula 4, 5 parts by weight of 2,2'-dihydroxy-3,3'-dimethyl-diphenylethane-(1,1) and 8 parts by weight of naphthoquinone-(1,2)-diazide-(2)-sulfochloride-(5) are dissolved in 100 parts by volume of dioxane. While agitating and at room temperature, sufficient 5 percent sodium carbonate solution is slowly added to render the reaction mixture neutral. About 75 parts by volume of the sodium carbonate solution are required. Subsequently, the reaction mixture is further agitated for one hour to complete the reaction. After adding 200 parts by volume of water, the mono-ester i.e. the 2-(naphthoquinone - (1,2) - diazide-(2)-sulfonyloxy-(5))hydroxy-(2')-dimethyl-(3,3')-diphenylethane-(1,1), precipitates as a yellow, solid compound. The compound is purified by dissolving it in glacial acetic acid and then reprecipitating it by adding water to the solution. The purified compound begins to melt at 150° C. while slowly charring. It is readily soluble in ethyleneglycol monomethylether but insoluble in alkalies and methanol.

*Example 4*

4 parts by weight of the compound corresponding to Formula 5, 3 parts by weight of an alkali soluble phenol-formaldehyde novolak ("Alnovol") and 0.5 part by weight of methyl violet (Schultz' "Farbstofftabellen," 7th edition, 1931, vol. 1, p. 327) are dissolved in 92.5 parts by volume of ethyleneglycol monomethylether. This solution is coated onto a bimetallic plate made up of aluminum and copper, and dried. The coated plate is exposed under a master and then developed with a 5 percent trisodium phosphate solution containing about 15 percent of ethyleneglycol monomethylether. The developed plate is treated for about 60–90 seconds with a solution containing 160 parts by weight of iron nitrate dissolved in 100 parts by volume of water. A printing plate is obtained which corresponds to the master used.

The compound corresponding to Formula 5 is prepared by dissolving 4.8 parts by weight of 2,2'-dihydroxy-4,4'-dimethyl-diphenylethane-(1,1) in 40 parts by volume of dioxane and combining this solution with a solution of 8.0 parts by weight of naphthoquinone-(1,2)-diazide-(2)-sulfochloride-(5) in 80 parts by volume of dioxane. While agitating and at room temperature sufficient 5 percent sodium carbonate solution (about 70 parts by volume) is added to the reaction mixture to render it neutral. For completion of the reaction, the reaction mixture is agitated for another hour and then 300 parts by volume of water are added. 2-(naphthoquinone-(1,2)-diazide-(2)-sulfonyloxy-(5)) - hydroxy-(2') - dimethyl - (4,4')-diphenylethane-(1,1) precipitates as a yellow, solid compound which is recrystallized from ethanol. It begins to sinter at 135° C. and to decompose slowly at 180° C.

*Example 5*

A degreased zinc plate is coated with a solution containing 4 parts by weight of the compound corresponding to Formula 6 and 3 parts by weight of a phenol-formaldehyde novolak, e.g. of the product mentioned in Example 4, dissolved in 100 parts by volume of ethyleneglycol monomethylether, and subsequently dried. The sensitized plate is exposed under a master, e.g. for about 5 minutes at 70 cm. distance from the lamp (a closed carbon arc lamp of 18 amps). Subsequently, the exposed plate is developed with a 5 percent trisodium phosphate solution containing about 15 percent of ethyleneglycol monomethylether. By etching the developed plate with nitric acid, a cliche is produced which may be used in a relief printing process for making copies. The printing plate corresponds to the master used.

For the preparation of the compound corresponding to Formula 6, 5.0 parts by weight of 2,2'-dihydroxy-3,3'-dimethyl-diphenyl-ethane-(1,1) and 8.0 parts by weight of naphthoquinone - (1,2) - diazide-(2)-sulfochloride-(4) are dissolved in 100 parts by volume of dioxane. While agitating and at room temperature, sufficient 5 percent sodium carbonate solution is slowly added to render the reaction mixture neutral. About 75 parts by volume of the sodium carbonate solution are used. To complete the reaction, the reaction mixture is further agitated for one hour. The 2-(naphthoquinone - (1,2) - diazide-(2)-sulfonyloxy - (4)) - hydroxy - (2') - dimethyl - (3,3')-diphenylethane-(1,1) thus formed precipitates as a yellow-brown oily product which solidifies to form a yellow, solid compound when about 200 parts by volume of water are added to the reaction mixture. The compound is purified by dissolving it in glacial acetic acid and then reprecipitating it by adding water to the solution. The purified substance melts at 168° C. with decomposition. It is readily soluble in ethyleneglycol monomethylether and insoluble in alkalies and methanol.

In the following, the preparation of a printing plate is described which consists of a trimetallic plate as the support and a layer thereon containing the compound corresponding to Formula 7.

4 parts by weight of the compound corresponding to Formula 7, 3 parts by weight of a phenol-formaldehyde novolak, e.g. of the product mentioned in Example 4, and 0.5 part by weight of methyl violet are dissolved in 92.5 parts by volume of ethyleneglycol monomethylether.

This solution is coated onto the chromium side of a trimetallic plate consisting of layers of aluminum, copper and chromium, and dried. The sensitized plate is exposed under an original and then developed under the same conditions as described in Example 4. Subsequently, the developed plate is etched for about 8–10 minutes with a solution consisting of 500 parts by weight of calcium chloride, 200 parts by volume of water, 80 parts by volume of concentrated hydrochloric acid and 80 parts by volume of glycerine; see US Patent No. 2,687,345. Thereby, the chromium layer, barring the copper layer, is removed from the exposed parts of the plate. Subsequently, greasy ink is applied which adheres to the areas in which the copper layer is laid free. Thus a printing plate is obtained from which negatives of the master used can be printed.

For the preparation of the compound corresponding to Formula 7, 4.8 parts by weight of 2,2′-dihydroxy-4,4′-dimethyl-diphenyl-ethane-(1,1) and 6.0 parts by weight of naphthoquinone - (1,2) - diazide-(2)-sulfochloride-(4) are dissolved together in 150 parts by volume of dioxane. While agitating and at room temperature, sufficient 5 percent sodium carbonate solution is slowly added to render the reaction mixture neutral or weakly alkaline. To complete the reaction, the mixture is further agitated for one hour. By adding about 200 parts by volume of water the mono-ester is precipitated in the form of a yellow-brown solid compound. The 2-(naphthoquinone-(1,2)-diazide-(2) - sulfonyloxy - (4)) - hydroxy - (2′)-dimethyl-(4,4′)-diphenyl-ethane-(1,1) is purified by recrystallization from ethanol. It melts at 145° C. with decomposition. The compound is easily soluble in ethyleneglycol monomethylether and insoluble in alkalies.

*Example 6*

1.5 parts by weight of the compound corresponding to Formula 8 and 3.5 parts by weight of a phenolformaldehyde novolak, e.g. of the product mentioned in Example 4, are dissolved in 100 parts by volume of ethyleneglycol monomethylether. The solution is coated onto a superficially roughened aluminum plate and dried, and the sensitized plate is exposed under a master. The exposed foil is developed with a 5 percent trisodium phosphate solution containing about 5 percent of ethyleneglycol monomethylether. After rinsing with water, the developed foil is treated with aqueous dilute phosphoric acid (1 percent) and inked with greasy ink. A printing plate corresponding to the master used is obtained.

For the preparation of the compound corresponding to Formula 8, 2.8 parts by weight of 2,2′-dihydroxy-4,4′-dimethoxy-diphenyl-ethane-(1,1) are dissolved in 30 parts by volume of dimethyl formamide and this solution is combined with a solution of 4.0 parts by weight of naphthoquinone - (1,2)-diazide-(2)-sulfochloride - (4) in 40 parts by volume of dioxane. While agitating and at room temperature, sufficient 5 percent sodium carbonate solution is added to render the reaction mixture neutral. About 50 parts by volume of the sodium carbonate solution are required. The mono-ester precipitates as a yellow-brown semi-solid product. The reaction mixture is agitated for another hour and then 300 parts by volume of water are added to complete precipitation. After repeatedly washing it with water, the reaction product solidifies. The 2-(naphthoquinone-(1,2)-diazide-(2)-sulfonyloxy-(4))-dihydroxy-(2′)-dimethoxy-(4,4′) - diphenyl-ethane-(1,1) is purified by recrystallizing it from methanol. It begins to sinter at 123° C. and decomposes at 245° C. The compound is easily soluble in ethyleneglycol monomethylether, but insoluble in alkalies.

*Example 7*

A degreased zinc plate is coated with a solution prepared by dissolving 4 parts by weight of the compound corresponding to Formula 9 and 3 parts by weight of a phenol-formaldehyde novolak in 100 parts by volume of ethyleneglycol monomethylether. After drying the coated solution, the sensitized zinc plate is exposed for about 5 minutes under a transparent master and then developed with a 5 percent trisodium phosphate solution containing about 15 percent of ethyleneglycol monomethylether. Subsequently, the developed plate is etched with nitric acid and the cliche thus formed is used for making reproductions according to the relief printing method. A printing plate is obtained which corresponds to the master used.

The compound corresponding to Formula 9 is prepared by dissolving 4.9 parts by weight of 2,4,2′,4′-tetrahydroxy-diphenyl-ethane-(1,1) in 40 parts by volume of a mixture consisting of equal parts of dioxane and dimethyl formamide. This solution is combined with another solution consisting of 12 parts by weight of naphthoquinone - (1,2)-diazide-(2)-sulfochloride-(5) in 100 parts by volume of dioxane. While agitating and at room temperature, 100 parts by volume of a 5 percent sodium carbonate solution are added to the mixture, drop by drop, until the latter has become neutral or weakly alkaline. In order to complete formation of the ester, the reaction mixture is agitated for another hour. The bis-ester precipitates in the form of a semi-solid yellow-brown product. After repeated washing with water, the reaction product becomes solid. After recrystallization from glacial acetic acid the 4,4′-bis-(naphthoquinone-(1,2) - diazide - (2)-sulfonyloxy-(5))-dihydroxy-(2,2′)-diphenylethane-(1,1) forms an orange colored finely crystalline substance which begins to melt at 350° C. while slowly charring. The compound is easily soluble in ethylene-glycol monomethylether, difficultly soluble in methanol and ethanol, and insoluble in alkalies.

*Example 8*

Analogously to the method described in Example 2, a printing plate is prepared using the compound corresponding to Formula 10. For development of the exposed foil, a 5 percent trisodium phosphate solution is used.

Equally good results are obtained when the compounds corresponding to Formulae 14–20, 23–26 or 28–29 listed in the following Table 1 are used. In the table, the most advantageous developer solution for each compound is also listed. Of these developer solutions A means an aqueous 5 percent trisodium phosphate solution, B means the developer (A) to which 5 percent of ethyleneglycol monomethylether has been added, and C means the developer (A) to which 15 percent of ethyleneglycol monomethylether has been added.

The compounds corresponding to Formulae 17 and 18 are preferably used without adding any phenol formaldehyde novolak.

TABLE 1

| Formula No.: | Developer |
|---|---|
| 14 | C |
| 15 | A |
| 16 | C |
| 17 | B |
| 18 | C |
| 19 | A |
| 20 | A |
| 23 | C |
| 24 | A |
| 25 | C |
| 26 | A |
| 28 | C |
| 29 | B |

The compound corresponding to Formula 10 is prepared as follows:

2.4 parts by weight of 2,4,2′,4′-tetrahydroxy-diphenyl-ethane-(1,1) are dissolved in a mixture of 20 parts by volume of dioxane and 10 parts by volume of dimethyl formamide, and the solution is combined with the solution consisting of 60 parts by weight of naphthoquinone-(1,2)-diazide-(2)-sulfochloride-(4) in 100 parts by volume of dioxane. While agitating and at room temperature, sufficient 5 percent sodium carbonate solution is slowly added to render the reaction mixture neutral. To complete formation of the ester the reaction mixture is agitated for another hour. The bis-ester precipitates as a semi-solid yellow-brown product which becomes solid after repeatedly washing it with water. After recrystallization from glacial acetic acid, the 4,4'-bis-(naphthoquinone-(1,2)-diazide-(2)-sulfonyloxy-(4)) - dihydroxy-(2,2')-diphenyl-ethane-(1,1) forms a finely crystalline yellow substance which begins to melt at 350° C. while slowly charring. The compound is readily soluble in ethyleneglycol monomethylether, difficultly soluble in methanol or ethanol, and insoluble in alkalies.

The compound corresponding to Formula 14 is prepared as follows:

2.6 parts by weight of 2,2',4,4'-tetrahydroxy-diphenyl propane-(1.1) are dissolved in a mixture of 20 parts by volume of dioxane and 20 parts by volume of dimethyl formamide, and the solution is combined with a solution of 6.0 parts by weight of naphthoquinone-(1,2)-diazide-(2)-sulfochloride-(5) in 100 parts by volume of dioxane. While agitating and at room temperature, sufficient 5 percent sodium carbonate solution is added to render the reaction mixture neutral or slightly alkaline, at most. To complete formation of the ester the reaction mixture is further agitated for one hour. The bis-ester precipitates as a semi-solid yellow-brown product which upon repeated washing with water becomes solid. After recrystallization from glacial acetic acid the 4,4'-bis-(naphthoquinone-(1,2)-diazide-(2)-sulfonyloxy-(5))-dihydroxy - (2,2')-diphenyl-propane-(1,1) is obtained as a yellow finely crystalline substance which begins to melt at about 350° C. while slowly charring. The compound is readily soluble in ethyleneglycol monoethylether, difficultly soluble in methanol or ethanol, and insoluble in alkalies.

The compound corresponding to Formula 15 is prepared as follows:

2.6 parts by weight of 2,2',4,4'-tetrahydroxy-diphenyl-propane-(1,1) are dissolved in a mixture of 20 parts by volume of dioxane and 20 parts by volume of dimethyl formamide, and the solution is combined with a solution of 6.0 parts by weight of naphthoquinone-(1,2)-diazide-(2)-sulfochloride-(4) in 100 parts by volume of dioxane. While agitating and at room temperature, sufficient 5 percent sodium carbonate solution is added as to render the reaction mixture neutral or weakly alkaline. To complete formation of the ester the reaction mixture is agitated for another hour. The bis-ester precipitates in the form of a semi-solid yellow-brown product which becomes solid after repeated washing with water. After recrystallization from glacial acetic acid, the 4,4'-bis-(naphthoquinone-(1.2)-diazide-(2)-sulfonyloxy-(4)) - dihydroxy-(2,2'-diphenyl-propane-(1,1) forms a yellow finely crystalline substance which begins to melt at about 350° C. while slowly charring. The compound is readily soluble in ethyleneglycol monomethylether, hardly soluble in methanol or ethanol, and insoluble in alkalies.

The compound corresponding to Formula 16 is prepared as follows:

2.8 parts by weight of 2,2',4,4'-tetrahydroxy-diphenyl-butane-(1,1) are dissolved in a mixture of 20 parts by volume of dioxane and 20 parts by volume of dimethyl formamide, and the solution is combined with a solution of 6.0 parts by weight of naphthoquinone-(1,2)-diazide-(2)-sulfochloride-(5) in 100 parts by volume of dioxane. While agitating and at room temperature, sufficient 5 percent sodium carbonate solution is slowly added to render the reaction mixture neutral or slightly alkaline. To complete formation of the ester the reaction mixture is further agitated for one hour. The bis-ester is obtained in the form of a semi-solid yellow-brown product which becomes solid after repeated washing with water. After recrystallization from glacial acetic acid, the 4,4'-bis-(naphthoquinone-(1,2)-diazide - (2) - sulfonyloxy - (5))-dihydroxy-(2,2')-diphenyl-butane-(1,1) forms a yellow finely crystalline substance which begins to melt at about 350° C. while slowly charring. The compound is readily soluble in ethylene glycol monomethylether, difficultly soluble in methanol or ethanol, and insoluble in alkalies.

The compound corresponding to Formula 17 is prepared as follows:

2.8 parts by weight of 2,2',4,4'-tetrahydroxy-diphenyl-butane-(1,1) are dissolved in a mixture of 20 parts by volume of dioxane and 20 parts by volume of dimethyl-formamide, and the solution is combined with a solution of 6.0 parts by weight of naphthoquinone-(1,2)-diazide-(2)-sulfochloride-(4) in 100 parts by volume of dioxane. While agitating and at room temperature, sufficient 5 percent sodium carbonate solution is slowly added as to render the reaction mixture neutral or weakly alkaline. To complete formation of the ester the reaction mixture is further agitated for one hour. The bis-ester precipitates as a semi-solid yellow-brown product which becomes solid after repeated washing with water. After recrystallization from glacial acetic acid, the 4,4'-bis-(naphthoquinone-(1,2)-diazide-(2)-sulfonyloxy - (4))-dihydroxy-(2,2')-diphenyl-butane-(1,1) forms a yellow finely crystalline substance which begins to melt at about 350° C. while slowly charring. The compound is easily soluble in ethyleneglycol monoethylether, difficultly soluble in methanol or ethanol, and insoluble in alkalies.

The compound corresponding to Formula 18 is prepared as follows:

2.9 parts by weight of 1,1-bis-(2-4-dihydroxyphenyl)-(3)-methyl-butyl-methane are dissolved in a mixture of 20 parts by volume of dioxane and 20 parts by volume of dimethyl formamide, and the solution is combined with a solution of 6.0 parts by weight of naphthoquinone-(1,2)-diazide-(2)-sulfochloride-(5) in 100 parts by volume of dioxane. While agitating and at room temperature, sufficient 5 percent sodium carbonate solution is added to render the reaction mixture neutral or weakly alkaline. For complete formation of the ester the reaction mixture is agitated for another hour. The bis-ester precipitates as a semi-solid yellow-brown product which becomes solid after repeated washing with water. After recrystallization from glacial acetic acid, the 1,1-bis-(naphthoquinone-(1,2-diazide-(2)-sulfonyloxy - (5) - hydroxy - (2)-phenyl)-(3)-methyl-butyl-methane forms a yellow finely crystalline substance which begins to melt at about 350° C. while slowly charring. The compound is readily soluble in ethylene-glycol monomethylether, difficultly soluble in methanol or ethanol, and insoluble in alkalies.

The compound corresponding to Formula 19 is prepared as follows:

2.9 parts by weight of 1,1-bis-(2-4-dihydroxyphenyl)-(3)-methyl-butyl-ethane are dissolved in a mixture of 20 parts by volume of dioxane and 20 parts by volume of dimethyl formamide, and the solution is combined with a solution of 6.0 parts by weight of naphthoquinone-(1,2)-diazide-(2)-sulfochloride-(4) in 100 parts by volume of dioxane. While agitatiing and at room temperature, sufficient 5 percent sodium carbonate solution is slowly added to render the reaction mixture neutral or weakly alkaline. For complete formation of the ester the reaction mixture is further agitated for one hour. The bis-ester precipitates as a semi-solid yellow-brown product which becomes solid after repeated washing with water. After recrystallization from glacial acetic acid, the 1,1-bis-(4-naphthoquinone-(1,2)-diazide - (2) - sulfonyloxy-(4)-hydroxy-(2)-phenyl)-(3) - methyl - butyl - methane forms a yellow finely crystalline substance which begins to melt at about 350° C. while slowly charring. The compound is easily soluble in ethyleneglycol monomethylether, difficultly soluble in methanol or ethanol, and insoluble in alkalies.

The compound corresponding to Formula 20 is prepared as follows:

2.5 parts by weight of 2,2',4,4',-tetrahydroxydiphenyl-propane-(2,) and 6.0 parts by weight of naphthoquinone-(1,2)-diazide-(2)-sulfochloride - (5) are simultaneously dissolved in 150 parts by volume of dioxane. While agitating and at room temperature, sufficient 5 percent sodium carbonate solution is slowly added to render the reaction mixture neutral or weakly alkaline. To complete the reaction the reaction mixture is further agitated for one hour. After adding 100 parts by volume of water, the bis-ester precipitates as a yellow-brown solid compound. The 4,4'-bis-(naphthoquinone-(1,2)-diazide-(2)-sulfonyloxy-(5))-dihydroxy-(2-2') - diphenyl - propane-(2,2) is purified by dissolving it in glacial acetic acid, reprecipitating it by adding water to the solution and then digesting it in methanol. The bis-ester thus obtained melts at 194–195° C. with decomposition. It is easily soluble in ethyleneglycol monomethylether, difficultly soluble in methanol or ethanol, and insoluble in alkalies.

The compound corresponding to Formula 23 is prepared as follows:

3.1 parts by weight of 2,4,2',4',-tetrahydroxy-triphenyl methane are dissolved in a mixture of 20 parts by volume of dioxane and 20 parts by volume of dimethylformamide, and the solution is combined with a solution of 6.0 parts by weight of naphthoquinone-(1,2)-diazide-(2)-sulfochloride-(5) in 100 parts by volume of dioxane. While agitating and at room temperature, sufficient 5 percent sodium carbonate solution is added to render the reaction mixture neutral or weakly alkaline. For complete formation of the ester the reaction mixture is agitated for another hour. The bis-ester precipitates as a semi-solid yellow-brown product which becomes solid after repeated washing with water. After recrystallization from glacial acetic acid the 4,4'-bis-(naphthoquinone-(1,2)-diazide-(2)- sulfonyloxy-(5))-dihydroxy-(2,2')-triphenyl-methane forms a yellow finely crystalline substance which begins to melt at about 350° C. while slowly charring. The compound is easily soluble in ethyleneglycol monomethylether, hardly soluble in methanol or ethanol, and insoluble in alkalies.

The compound corresponding to Formula 24 is prepared as follows:

3.1 parts by weight of 2,4,2',4'-tetrahydroxy-triphenyl-methane are dissolved in the mixture of 20 parts by volume of dioxane and 20 parts by volume of dimethyl formamide, and the solution is combined with a solution of 6.0 parts by weight of naphthoquinone-(1,2)-diazide-(2)-sulfochloride-(4) in 100 parts by volume of dioxane. While agitating and at room temperature, sufficient 5 percent sodium carbonate solution is slowly added to render the reaction mixture neutral or weakly alkaline. For complete formation of the ester of the reaction mixture is agitated for another hour. The bis-ester precipitates as a semi-solid yellow brown product which becomes solid after repeated washing with water. After recrystallization from glacial acetic acid, the 4,4'-bis-(naphthoquinone-(1,2)-diazide-(2) - sulfonyloxy - (4))-dihydroxy - (2,2')-triphenyl-methane forms a yellow finely crystalline substance which begins to melt at about 350° C. while slowly charring. The compound is easily soluble in ethyleneglycol monomethylether, difficultly soluble in methanol or ethanol, and insoluble in alkalies.

The compound corresponding to Formula 25 is prepared as follows:

3.3 parts by weight of 2,2',4,4',4''-pentahydroxy-triphenyl-methane and 6.0 parts by weight of naphthoquinone-(1,2)-diazide - (2) - sulfochloride - (5) are simultaneously dissolved in 500 parts by volume of dioxane. While agitating and at room temperature, sufficient 5 percent sodium carbonate solution is slowly added to render the reaction mixture neutral or slightly alkaline. For complete reaction the reaction mixture is further agitated for one hour. After adding 300 parts by volume of water to the mixture, the bis-ester precipitates as a yellow solid compound. The 4,4'-bis-(naphthoquinone-(1,2) - diazide - (2) - sulfonyloxy - (5)) - trihydroxy-(2,2',4'')-triphenyl-methane is purified by dissolving it in glacial acetic acid, reprecipitating it by adding water to the solution and finally digesting it with methanol. The bis-ester thus formed begins to melt at about 350° C. while charring slowly. It is easily soluble in ethyleneglycol monomethylether, difficultly soluble in methanol or ethanol, and insoluble in alkalies.

The compound corresponding to Formula 26 is prepared as follows:

3.3 parts by weight of 2,2',4,4',4''-pentahydroxy-triphenyl-methane and 6.0 parts by weight of naphthoquinone-(1,2)-diazide-(2)-sulfochloride-(4) are dissolved together in 150 parts by volume of dioxane. While agitating and at room temperature, sufficient 5 percent sodium carbonate solution is slowly added to render the reaction mixture neutral or weakly alkaline. For complete reaction the reaction mixture is further agitated for one hour. After adding 200 parts by volume of water to the mixture, the bis-ester precipitates as a yellow-brown solid compound. The 4,4'-bis-(naphthoquinone-(1,2) - diazide - (2) - sulfonyloxy - (4)) - trihydroxy-(2,2',4'')-triphenyl-methane is purified by dissolving it in glacial acetic acid, reprecipitating it by adding water to the solution and then digesting it with methanol. The bis-ester thus formed begins to melt at about 350° C. while charring. It is easily soluble in ethyleneglycol monomethylether, difficultly soluble in methanol or ethanol, and insoluble in alkalies.

The compound corresponding to Formula 28 is prepared as follows:

3.0 parts by weight of 2,2',4,4'-tetrahydroxy-diphenyl-cyclohexane-(1,1) and 6.0 parts by weight of naphthoquinone-(1,2)-diazide-(2)-sulfochloride-(5) are dissolved together in 100 parts by volume of dioxane. While agitating and at room temperature, sufficient 5 percent sodium carbonate solution is slowly added to render the reaction mixture neutral or weakly alkaline. To complete formation of the ester the reaction mixture is agitated for another hour. The bis-ester precipitates as a semi-solid yellow-brown product which becomes solid after repeated washing with water. After recrystallization from alcohol, the 4,4'- bis - (naphthoquinone-(1,2)-diazide-(2)-sulfonyloxy - (5)) - dihydroxy - (2,2') - diphenyl - cyclohexane-(1,1) forms a yellow finely crystalline substance which melts at 245–246° C. with decomposition. The compound is soluble in ethyleneglycol monomethylether and insoluble in alkalies.

The compound corresponding to Formula 29 is prepared as follows:

3.0 parts by weight of 2,2',4,4'-tetrahydroxy-diphenyl-cyclohexane-(1,1) are dissolved in 30 parts by volume of dimethyl formamide and this solution is combined with a solution of 6.0 parts by weight of naphthoquinone-(1,2)-diazide-(2)-sulfochloride-(4) in 100 parts by volume of dioxane. While agitating and at room temperature, sufficient 5 percent sodium carbonate solution is slowly added to render the reaction mixture neutral or weakly alkaline. For completion of the reaction the mixture is agitated for another hour. The bis-ester precipitates as a yellow-brown oily product which becomes solid after repeated washing with water. After recrystallization from alcohol, the 4,4'-bis-(naphthoquinone-(1,2)-diazide - (2) - sulfonyloxy - (4)) - dihydroxy - (2,2')-diphenyl-cyclohexane-(1,1) forms a finely crystalline yellow substance which melts at 222–223° C. with decomposition. The bis-ester is readily soluble in ethyleneglycol monomethylether, but insoluble in alkalies.

*Example 9*

In a manner similar to the process described in Example 1, a superficially roughened aluminum foil is coated with a solution of the compound corresponding to Formula 21 in ethyleneglycol monomethylether, dried, and exposed under a master. For development of the exposed foil, a 5 percent trisodium phosphate solution is used also containing about 15 percent of ethyleneglycol monomethylether. A printing plate is obtained which corresponds to the master used.

The compound corresponding to Formula 21 is prepared as follows:

3.4 parts by weight of 3,3′-dihydroxy-4,4′-dimethoxy-triphenyl-methane are dissolved in 30 parts by volume of dimethyl formamide and this solution is combined with a solution of 3.0 parts by weight of naphthoquinone-(1,2)-diazide-(2)-sulfochloride-(5) in 50 parts by volume of dioxane. While agitating and at room temperature, sufficient 5 percent sodium carbonate solution is slowly added to render the reaction mixture neutral or slightly alkaline. For completion of the reaction, agitation is continued for one hour. Thereafter, the crude mono-ester has precipitated in the form of a yellow-brown oil. After repeated washing with water, the compound solidifies to form a solid yellow substance which is subsequently recrystallized from alcohol. The purified 2-(naphthoquinone-(1,2)-diazide-(2)sulfonyloxy - (5)) - hydroxy-(2′)-dimethyoxy-(4,4′)-triphenylmethane melts at about 270° C. with decomposition. It is readily soluble in ethyleneglycol monomethylether, and insoluble in alkalies.

*Example 10*

1.5 parts by weight of the compound corresponding to Formula 22 and 1.5 parts by weight of colophony are dissolved in a mixture consisting of 8 parts by volume of isopropyl ketone and 2 parts by volume of ethyleneglycol monomethylether. The solution is coated onto a roughened aluminum foil and dried to form a firmly adherent layer. The thus sensitized foil is exposed under a master, developed with a ten percent sodium carbonate solution, and briefly wiped over with one percent phosphoric acid. After inking with greasy ink, the printing plate thus formed, which corresponds to the master used, may be used for printing.

The compound corresponding to Formula 22 is prepared as follows:

3.4 parts by weight of 2,2′-dihydroxy-4,4′-dimethoxy-triphenyl-methane are dissolved in 30 parts by volume of dimethyl formamide and this solution is combined with a solution of 3.0 parts by weight of naphthoquinone-(1,2)-diazide-(2)-sulforchloride-(4) in 50 parts by volume of dioxane. While agitating and at room temperature as much of a ten percent sodium bicarbonate solution is slowly added to render the reaction mixture neutral. For completion of the reaction agitation is continued for one hour. In the meantime, the crude mono-ester has precipitated as a yellow-brown oil which becomes solid after repeated washing with water. After recrystallization from ethanol, the 2 - (naphthoquinone - (1,2)-diazide-(2)-sulfonyloxy - (4))-hydroxy-(2′)-dimethoxy-(4,4′)-triphenylmethane is obtained as a yellow finely crystalline substance which melts at 258° C. with decomposition. The mono-ester is readily soluble in ethyleneglycol monomethylether and insoluble in alkalies.

*Example 11*

1.5 parts by weight of the compound corresponding to Formula 30 and 3.5 parts by weight of a phenol-formaldehyde novolak, e.g. of the product mentioned in Example 4, are dissolved in 100 parts by volume of a 1:1 mixture of dimethyl formamide and ethyleneglycol monomethylether. The solution is coated onto a mechanically roughened aluminum foil. After drying the coated foil and exposing the light sensitive layer under a master, the foil is developed with a 5 percent trisodium phosphate solution also containing 15 percent of ethyleneglycol monomethylether. After a short treatment of the developed foil with about 1 percent phosphoric acid, the foil is inked with greasy ink and used for printing. The printing plate corresponds to the master used.

The compound corresponding to Formula 30 is prepared as follows:

18.0 parts by weight of 2,2′-dihydroxy-dinapthyl-(1,1′)-methane and 16.8 parts by weight of naphthoquinone-(1,2)-diazide-(2)-sulfochloride-(5) are together dissolved in 200 parts by volume of dioxane. While agitating and at room temperature, sufficient 5 percent sodium carbonate solution is slowly added to render the reaction mixture neutral or slightly alkaline. For completion of the reaction agitation is continued for one hour. After adding 200 parts by volume of water the mono-ester precipitates in the form of a yellow solid compound. For purification, the 2-naphthoquinone-(1,2)-diazide-(2)-sulfonyloxy-(5))-hydroxy-(2′)-dinaphthyl-(1,1′)-methane is first dissolved in ethyleneglycol monomethylether, then reprecipitated by adding water to the solution, and finally digested with methanol. The mono-ester melts at 211° C. with decompositon. It is easily soluble in ethyleneglycol monoethylether, difficultly soluble in methanol or ethanol and insoluble in alkalies.

Instead of the compound corresponding to Formula 30, and with the same good result, there may be used the compound corresponding to Formula 31 for the photomechanical production of printing plates.

The compound corresponding to Formula 31 is prepared as follows:

18 parts by weight of 2,2′-dihydroxy-dinaphthyl-(1,1′)-methane and 16.8 parts by weight of naphthoquinone-(1,2)-diazide-(2)-sulfochloride-(4) are dissolved in 200 parts by volume of dioxane. While agitating and at room temperature, sufficient ten percent sodium bicarbonate solution is slowly added as an acid-binding agent to render the reaction mixture neutral. For complete reaction the mixture is agitated for another hour. At this time the crude mono-ester has precipitated as a yellow-brown oil which becomes solid by repeatedly washing it with water. By recrystallization from glacial acetic acid and subsequent digestion in methanol, the 2-(naphthoquinone - (1,2) - diazide-(2)-sulfonyloxy-(4))-hydroxy-(2′)-dinaphthyl-(1,1′)-methane is obtained as a yellow finely crystalline substance which melts at 168° C. with decomposition. It is easily soluble in ethyleneglycol monomethylether and insoluble in alkalies or methanol.

*Example 12*

Two parts by weight of 4.4′-bis-[naphthoquinone-(1.2)-diazide-(2)-sulfonyloxy - (5)] - dihydroxy-(2.2′)-dimethyl-(6,6′)-diphenylmethane corresponding to Formula 1 and 6 parts by weight of a light colored m-cresol-formaldehyde-resin novolak having a softening point of 108–118° C. are dissolved in 100 parts by volume of ethyleneglycol monomethylether. 0.3 part by weight of maize oil and 0.5 part by weight of "Methyl Violet BB" are added, the solution is filtered and then coated onto a polished zinc plate. The layer is then dried by means of warm air. For the preparation of a printing plate the layer side of the zinc plate is exposed through a diapositive. The exposed layer which now carries the image is treated with a cotton pad soaked with 2.5% approx. trisodium phosphate solution containing also 10–15% (by volume) of ethyleneglycol monomethylether. The parts of the layer which were affected by light during the exposure are removed from the surface of the zinc plate, and an image corresponding to the master used remains. After rinsing with water, the plate is placed, coated side downwards, on an earthenware trough, containing rotating finned wheels which project dilute (7–8%) nitric acid against the plate by centrifugal action. Etching is performed either by the usual process in several steps or according to the one-step process. Without heating the zinc plate before etching, a printing plate is obtained which is especially suitable for book and illustration printing.

*Example 13*

In 100 parts by volume of ethyleneglycol monomethylether there are dissolved 2 parts by weight of 4.4′-bis-[naphthoquinone-(1.2)-diazide - (2) - sulfonyloxy-(4)]-dihydroxy-(2.2′)-diphenylethane-(1.1′) corresponding to Formula 10, and 6 parts by weight of a m-cresol-formaldehyde resin novolak having the qualities described in the preceding example. 0.3 part by weight of sesame oil and 0.5 part by weight of rosaniline hydrochloride are added, and the solution is filtered and coated onto a polished copper plate. After exposure under a photographic negative the layer is treated with a cotton pad soaked with 2.5% approx. trisodium phosphate solution, also containing 10–15% (by volume) of ethyleneglycol monomethylether; thereby the light affected parts of the layer are removed. The copper plate carrying parts of the layer corresponding to the master is now etched at 20–22° C. by means of an iron-chloride solution of 40° Bé. The light sensitive solution is also suitable for directly coating rotating copper cylinders by means of a spray nozzle.

It will be obvious to those skilled in the art that many modifications may be made within the scope of the present invention without departing from the spirit thereof, and the invention includes all such modifications.

What is claimed is:

1. A compound having the formula

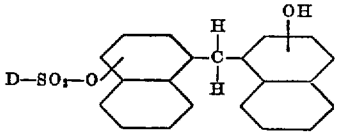

in which D is a naphthoquinone-1,2-diazide group.

2. A compound having the formula

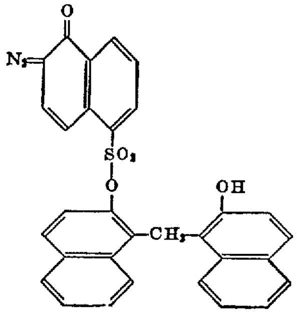

3. A compound having the formula

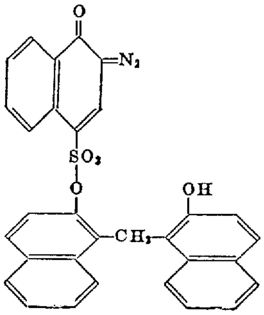

4. A presensitized printing plate comprising a base material coated with a layer comprising a compound having the formula

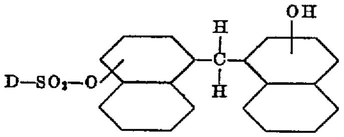

in which D is a naphthoquinone-1,2-diazide group.

5. A process for making a printing plate which comprises exposing a coated base material to light under a master, the coating comprising a compound having the formula

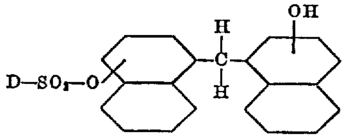

in which D is a naphthoquinone-1,2-diazide group, and treating the exposed coating with a weakly alkaline developing solution.

References Cited by the Examiner

UNITED STATES PATENTS

| | | | |
|---|---|---|---|
| 2,289,804 | 7/42 | Peterson | 260—456 |

FOREIGN PATENTS

| | | |
|---|---|---|
| 706,028 | 3/54 | Great Britain. |
| 708,834 | 5/54 | Great Britain. |
| 737,379 | 9/55 | Great Britain. |
| 739,654 | 11/55 | Great Britain. |

NORMAN G. TORCHIN, *Primary Examiner.*

MILTON STERMAN, HAROLD N. BURSTEIN, PHILIP E. MANGAN, ABRAHAM WINKELSTEIN, WILLIAM B. KNIGHT, *Examiners.*